United States Patent
Sato et al.

(10) Patent No.: US 7,134,183 B2
(45) Date of Patent: Nov. 14, 2006

(54) METHOD OF MAKING A THIN-FILM MAGNETIC HEAD

(75) Inventors: Kazuki Sato, Chuo-ku (JP); Takeo Kagami, Chuo-ku (JP)

(73) Assignee: TDK Corporation, Tokyo (JP)

( * ) Notice: Subject to any disclaimer, the term of this patent is extended or adjusted under 35 U.S.C. 154(b) by 486 days.

(21) Appl. No.: 10/703,438
(22) Filed: Nov. 10, 2003

(65) Prior Publication Data

US 2004/0117976 A1 Jun. 24, 2004

(30) Foreign Application Priority Data

Dec. 19, 2002 (JP) ............................ 2002-368601

(51) Int. Cl.
*G11B 5/127* (2006.01)
*C23C 14/00* (2006.01)
*B44C 1/22* (2006.01)

(52) U.S. Cl. .............................. 29/603.12; 29/603.07; 29/603.03; 29/603.15; 29/603.14; 204/192.34; 216/22

(58) Field of Classification Search ............. 29/603.12, 29/603.07, 603.14, 603.15, 603.03, 603.18; 360/319, 320, 317, 327; 204/192.34, 192.35; 216/22, 66, 100

See application file for complete search history.

(56) References Cited

U.S. PATENT DOCUMENTS

| 5,745,980 A | * | 5/1998 | Cohen .................... 29/603.14 |
| 5,985,162 A | * | 11/1999 | Han et al. .................... 216/22 |
| 6,198,608 B1 | * | 3/2001 | Hong et al. ................. 360/320 |
| 6,381,107 B1 | * | 4/2002 | Redon et al. ............ 360/324.2 |
| 6,392,852 B1 | * | 5/2002 | Sasaki ........................ 360/320 |

FOREIGN PATENT DOCUMENTS

| JP | A 11-191206 | 7/1999 |
| JP | A 11-316919 | 11/1999 |
| JP | A 2002-204003 | 7/2002 |

\* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

The method of making a thin-film magnetic head in accordance with the present invention forms a cover layer on an insulating layer about a magnetoresistive film so as to eliminate a protrusion riding on the magnetoresistive film. Then, the protrusion can be eliminated by etching. The part of insulating layer clad with the cover layer is not etched. This can prevent short-circuit from occurring because of thinning the insulating layer.

7 Claims, 9 Drawing Sheets

METHOD OF MAKING A THIN-FILM MAGNETIC HEAD

BACKGROUND OF THE INVENTION

1. Field of the Invention

The present invention relates to a method of making a thin-film magnetic head, a method of making a head gimbal assembly, a method of making a hard disk drive, and a thin-film magnetic head.

2. Related Background Art

In general, for yielding a magnetoresistive film such as TMR (Tunneling MagnetoResistive) film, a resist layer is initially formed on a magnetic layer formed on a lower shield layer, and then, using the resist layer as a mask, the magnetic layer is etched so as to be formed into a magnetoresistive film having a desirable pattern. Further, an insulating layer for insulating the lower shield layer and an upper shield layer, which will be formed later, from each other is formed about thus obtained magnetoresistive film (as disclosed in Japanese Patent Application Laid-Open No. HEI 11-191206, for example).

SUMMARY OF THE INVENTION

However, the inventors have found that there is a fear of the upper shield layer and the magnetoresistive film short-circuiting therebetween. The reason will be explained with reference to the conventional manufacturing process shown in FIGS. 8A to 8C and 9A to 9C.

First, as shown in FIG. 8A, a magnetic layer 110 to become a TMR film (magnetoresistive film) is formed on a lower shield layer 101, and a resist layer 120 is formed on the magnetic layer 110. Subsequently, using the resist layer 120 as a mask, ion-milling is carried out, such that the magnetic layer 110 is patterned into a TMR film 130 having a desirable pattern. FIG. 8B and the drawings subsequent thereto show only the part on the right side of a dash-single-dot line 1 in FIG. 8A.

Then, as shown in FIG. 8C, an insulating layer 121 such as $Al_2O_3$ is formed by sputtering or the like, so as to secure insulation about the TMR film 130. Here, an insulating layer 131 is deposited on the resist layer 120 in addition to that surrounding the TMR film 130. Also, under the influence of the incident angle of particles at the time of sputtering and the like, a protrusion 121a riding on the TMR film 130 is formed. Further, a depression 121b depressed as a shadow of the resist layer (by so-called shadow effect) is formed between the protrusion 121a and a flat part 121c.

Next, as shown in FIG. 9A, liftoff is carried out, so as to remove the resist layer 120 together with the insulating layer 131 deposited thereon. This drawing shows the state after the liftoff. As depicted, the protrusion 121a still remains in the insulating layer 121. The protrusion 121a may block current paths of the TMR 130, and so forth, and thus is preferably removed. Therefore, as shown in FIG. 9B, the protrusion 121a on the TMR film 130 is removed by wet etching, for example. Thereafter, as shown in FIG. 9C, an upper shield layer 140 is formed by sputtering or the like, for example, so as to complete a reproducing section of a thin-film magnetic head.

In thus manufactured thin-film magnetic head, however, the depression 121b may become deeper when removing the protrusion 121a by wet etching in the step of FIG. 9B, thereby causing the upper shield layer 140 and the TMR film 130 to short-circuit therebetween.

For overcoming the problem mentioned above, it is an object of the present invention to provide a method of making a thin-film magnetic head, a method of making a head gimbal assembly, a method of making a hard disk drive, and a thin-film magnetic head which can eliminate a protrusion riding on a magnetoresistive film in an insulating layer formed about the magnetoresistive film while preventing short-circuit from occurring because of thus thinned insulating layer.

The present invention provides a method of making a thin-film magnetic head comprising a magnetoresistive film, the method comprising the steps of forming a magnetic layer to become the magnetoresistive film; forming a resist layer on an upper side of the magnetic layer; patterning the magnetic layer while using the resist layer as a mask so as to yield the magnetoresistive film; laminating an insulating layer about the magnetoresistive film; forming a cover layer on the insulating layer so as to exclude a protrusion riding on the magnetoresistive film in the insulating layer; and etching the insulating layer formed with the cover layer so as to eliminate the protrusion.

In the method of making a thin-film magnetic head in accordance with the present invention, the protrusion riding on the magnetoresistive film can be removed by etching. Also, since the insulating layer surrounding the magnetoresistive film is formed with the cover layer so as to exclude the protrusion, the part clad with the cover layer in the insulating layer is not etched. This can prevent short-circuit from occurring because of thinning the insulating layer.

Preferably, in the method of the present invention, a particle forming the cover layer has a greater incident angle with respect to a surface direction of the magnetoresistive film than an incident angle of a particle forming the insulating layer with respect to the surface direction of the magnetoresistive film.

When forming the insulating layer about the magnetoresistive film, the resist layer is disposed on the magnetoresistive film as mentioned above. If the insulating layer is formed by sputtering in this state, a depression acting as a shadow of the resist layer appears (so-called shadow effect). As the depression is shallower, the occurrence of short-circuit is suppressed more effectively. Therefore, sputtering particles are made incident on the magnetoresistive film while being inclined with respect to a normal of the magnetoresistive film. Making particles obliquely incident on the lower side of the resist layer as such becomes a cause of forming the protrusion. Subsequently, when forming the cover layer by sputtering, the incident angle of particles with respect to the surface direction of the magnetoresistive film is made greater than that at the time of forming the insulating layer as mentioned above. Namely, the particle incident angle is closer to the normal of the magnetoresistive film when forming the cover layer than when forming the insulating layer. As a result, the cover layer can easily be formed so as to exclude the protrusion.

Preferably, in the present invention, the magnetoresistive film is configured such that a sense current flows in a layer thickness direction. When the thin-film magnetic head has a so-called CPP (Current Perpendicular to Plane) structure in which the sense current flows in the film thickness direction as such, the insulating layer riding on the magnetoresistive film blocks the current. When the present invention is employed in a thin-film magnetic head having a CPP structure, the sense current flows favorably, whereby magnetic information reproducing performances can be improved.

The cover layer may be formed by $SiO_2$ or AlN. The cover layer may also be formed by a metal selected from the group consisting of Ta, Cr, Ti, Fe, Co, Ru, Au, Ni, and alloys thereof.

The method of making a head gimbal assembly in accordance with the present invention comprises the step of mounting thus obtained thin-film magnetic head to a gimbal. The method of making a hard disk drive in accordance with the present invention comprises the step of assembling the hard disk drive such that thus obtained thin-film magnetic head can read a magnetic signal recorded on a hard disk. Therefore, thus manufactured head gimbal assembly and hard disk drive can eliminate the protrusion riding on the magnetoresistive film in the insulating layer formed about the magnetoresistive film while preventing short-circuit from occurring because of thus thinned insulating layer. As a consequence, the head gimbal assembly and hard disk drive attain a higher reliability.

The present invention provides a thin-film magnetic head comprising a magnetoresistive film having a magnetoresistance effect; lower and upper shield layers formed on respective sides of the magnetoresistive film by a ferromagnetic material; an insulating layer formed at least in a region, between the lower and upper shield layers, on a side opposite from the surface facing a recording medium in the magnetoresistive film; and a cover layer not covering the surface of the magnetoresistive film facing the upper shield layer but the surface of the insulating layer facing the upper shield layer.

Even if a part of the insulating layer rides on the magnetoresistive film in the thin-film magnetic head in accordance with the present invention in a step of making the same, the upper cover layer does not cover the surface of the magnetoresistive film on the upper shield layer side, whereby the protrusion can be eliminated by etching. Since the cover layer covers the insulating layer on the upper shield layer side, thus covered part is not etched. This can prevent short-circuit from occurring because of thinning the insulating layer. The cover layer may be formed by the materials mentioned above.

BRIEF DESCRIPTION OF THE DRAWINGS

The present invention may be more readily described with reference to the accompanying drawings, in which.

DESCRIPTION OF THE PREFERRED EMBODIMENTS

In the following, preferred embodiments of the present invention will be explained in detail with reference to the accompanying drawings. Constituents identical to each other will be referred to with numerals identical to each other without repeating their overlapping explanations.

Figure 1:
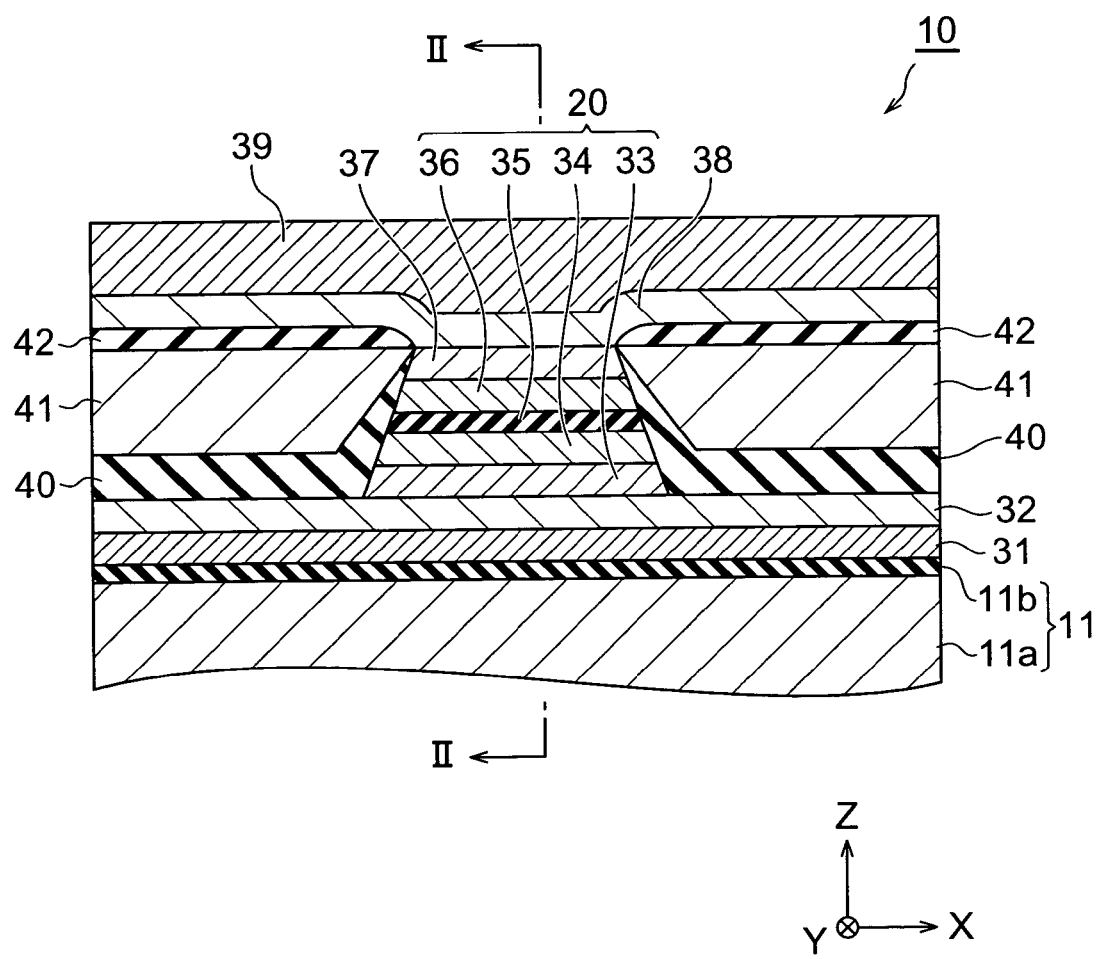
FIG. 1 is a sectional view showing an embodiment of the thin-film magnetic head in accordance with the present invention.
Figure 2:
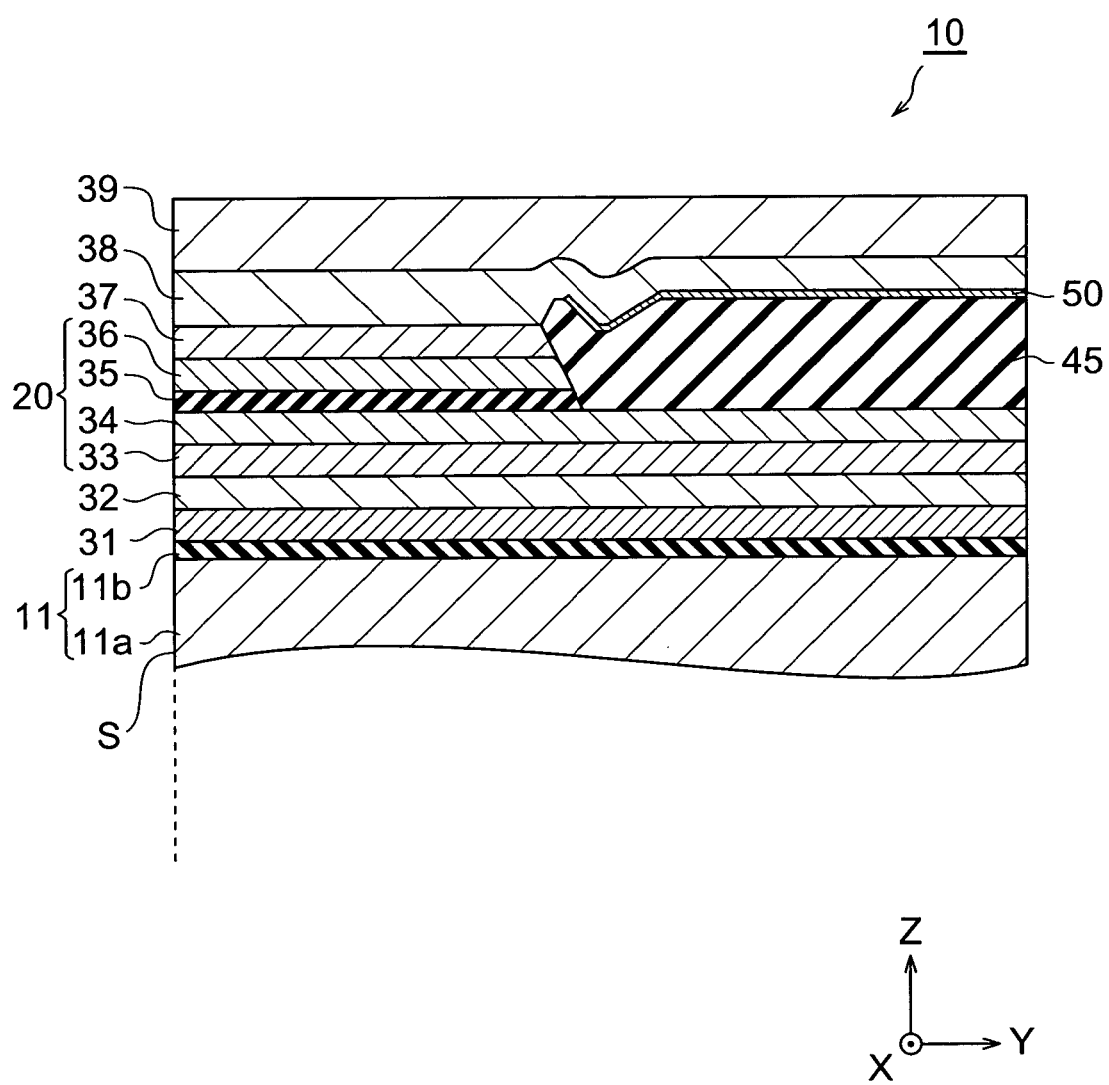
FIG. 2 is a sectional view taken along the line II—II of FIG. 1.

FIG. 1 is a sectional view showing the thin-film magnetic head in accordance with an embodiment of the present invention at apart slightly inside of a surface (hereinafter referred to as "air bearing surface (ABS) S") facing a recording medium, whereas FIG. 2 is a sectional view taken along the line II—II of FIG. 1. Words "upper" and "lower" used in the explanation correspond to the upper and lower sides in FIG. 1, respectively.

This thin-film magnetic head 10 is a TMR head utilizing a magnetoresistance effect occurring at a tunnel junction. In the thin-film magnetic head 10, a lower shield layer 31 also acting as a lower electrode, a lower metal layer 32, a pinning layer (antiferromagnetic layer) 33, a pinned layer 34, a tunnel barrier layer (intermediate layer) 35, a free layer 36, a first upper metal layer 37, a second upper metal layer 38, and an upper shield layer 39 also acting as an upper electrode are successively laminated on a support 11 in this order. The layers 33 to 36 constitute a TMR film (magnetoresistive film). As shown in FIG. 1, hard bias layers 41, 41 made of a hard magnetic material are formed on both track width ends of the free layer 36 by way of insulating layers 40, 40. Also, insulating layers 42, 42 are formed between the hard bias layers 41, 41 and the second upper metal layer 38.

The support 11 comprises a substrate 11a made of AlTiC ($Al_2O_3$.TiC) and an undercoat layer 11b formed thereon from an electrically insulating material such as alumina ($Al_2O_3$) by a thickness of about 1 μm to about 10 μm.

The lower shield layer 31 and the upper shield layer 39 are made of a ferromagnetic material such as NiFe (Permalloy) and prevent the TMR device from sensing unnecessary external magnetic fields. Each of the shield layers 31, 39 has a thickness of about 1 μm to about 3 μm, for example. The lower shield layer 31 also acts as an electrode as mentioned above, whereby an electron supplied from the lower shield layer 31 is transmitted to the upper shield layer 39, which acts as the upper electrode, by way of the lower metal layer 32, pinning layer 33, pinned layer 34, tunnel barrier layer 35, free layer 36, first upper metal layer 37, and second upper metal layer 38. Namely, the sense current flows in the film thickness direction of the TMR film.

The lower metal layer 32, first upper metal layer 37, and second upper metal layer 38 are used for adjusting a read gap corresponding to the recording density of a recording medium to a desirable value. The upper metal layers 37, 38 also act to prevent the free layer 36 and the like from oxidizing. Examples of materials forming the metal layers 32, 37, 38 include Cu, Al, Au, Ta, NiCr, Ru, and Rh. Each metal layer may have a laminate structure.

The pinning layer 33 has a thickness of about 5 nm to about 30 nm, and may be formed by an antiferromagnetic material such as PtMn, for example, which can fix the magnetizing direction of the pinned layer 34 by exchange coupling.

The pinned layer 34 has a thickness of about 1 nm to about 10 nm, and may be formed by a ferromagnetic material such as Fe, Co, Ni, or CoFe, for example. The magnetizing direction of the pinned layer 34 is fixed to the Y direction (or the direction opposite therefrom) in the drawing by exchange coupling with the pinning layer 33.

The tunnel barrier layer 35 is a thin, nonmagnetic, insulating layer through which electrons can pass while keeping their spins by tunnel effect. The tunnel barrier layer 35 has a thickness of about 0.5 nm to about 2 nm, and may be formed by an insulating material such as $Al_2O_3$, NiO, MgO, $Ta_2O_5$, or $TiO_2$, for example.

The free layer 36 changes the magnetizing direction under the influence of magnetic fields leaking from a recording medium such as hard disk. The free layer 36 has a thickness of about 1 nm to about 10 nm, and may be formed by a ferromagnetic material such as Fe, Co, Ni, FeCo, FeCoNi, or CoZrNb, for example. Magnetic fluxes from the upper hard bias layers 41, 41 made of CoTa, CoCrPt, CoPt, or the like turn the free layer 36 into a single domain extending along the X direction in the drawing. As the air bearing surface S approaches a magnetization shifting area of a hard disk, the magnetizing direction of the free layer 36 shifts toward the positive or negative direction of the Y axis. When the magnetizing direction of the pinned layer 34 oriented in the Y-axis direction and the magnetizing direction of the free layer 36 coincide with each other, the current flowing through the tunnel barrier layer 35 increases. When the magnetizing directions are opposite from each other, the current decreases.

The insulating layer 40 is formed by $Al_2O_3$ or the like, and prevents the current flowing through the free layer 36 or the like from leaking toward the hard bias layer 41. The insulating layer 42 may also be formed by $Al_2O_3$ or the like, and prevents the current from leaking from the upper shield layer 39 to the hard bias layer 41.

As shown in FIG. 2, an insulating layer 45 made of $Al_2O_3$ or the like is formed on the rear side of the TMR film 20 as seen from the air bearing surface S, i.e., in an area, between the lower shield layer 31 and the upper shield layer 39, on the side of the TMR film 20 opposite from the air bearing surface S. The surface of the insulating layer 45 on the upper shield layer 39 side is clad with a cover layer 50 made of Ta. The cover layer 50 has a thickness of about 0.5 nm to about 5 nm, and is formed so as not to cover the surface of the TMR film 20 on the upper shield layer 39 side. The effect of providing the cover layer 50 will be explained later. Though the lower metal layer 32 and the second upper metal layer 38 are disposed between the insulating layer 45 and the respective shield layers 31, 39 in this embodiment, it is not always necessary to provide the metal layers 32, 38 in these areas. Namely, the cover layer 50 and the upper shield layer 39 may be in contact with each other, whereas the insulating layer 45 and the lower shield layer 31 may be in contact with each other.

With reference to FIGS. 3A to 3C and 4A to 4D showing manufacturing steps, a method of making the thin-film magnetic head in accordance with this embodiment will be explained. Though the metal layers 32, 37, 38 will be omitted from the explanation for easier understanding of the invention, these layers are formed in practice as necessary.

Figure 3A:
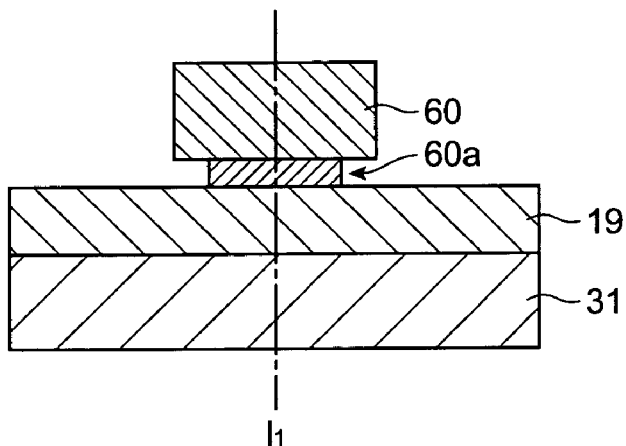
FIGS. 3A to 3C are views showing manufacturing steps in an embodiment of the method of making a thin-film magnetic head in accordance with the present invention.

First, as shown in FIG. 3A, a magnetic layer 19 to become a TMR film is formed on a lower shield layer 31 formed on a substrate 11 (not depicted). Though the magnetic layer 19 has a multilayer structure including layers to become a pinning layer 33, a pinned layer 34, a tunnel barrier layer 35, and a free layer 36 (see FIGS. 1 and 2), it is illustrated as a single layer for simplification. Subsequently, a resist layer 60 is formed on the upper side of the magnetic layer 19. The resist layer 60 is formed with a depressed undercut 60a on each of both sides (right and left sides in the drawing) of the bottom part (near the interface with the magnetic layer 19). Forming such an undercut 60a makes it easier for the resist layer 60 to carry out liftoff which will be explained later. An example of methods of forming the undercut 60a comprises the steps of coating the magnetic layer 19 with a layer of polymethyl glutarimide (PMGI) having a low molecular weight and then applying an electron beam resist onto this layer as described in Japanese Patent Publication No. HEI 7-6058. The undercut 60a maybe formed by various known techniques such as those described in Japanese Patent No. 2973874 and No. 2922855.

Figure 3B:
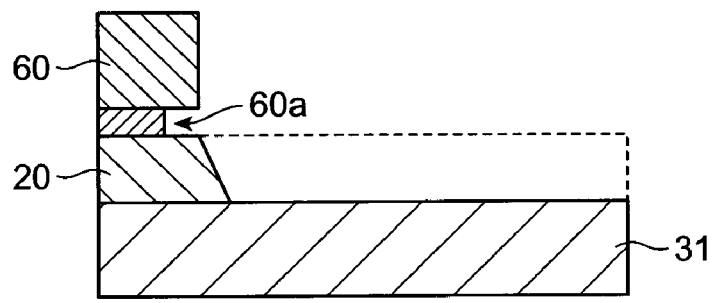

Then, as shown in FIG. 3B, ion milling or the like is carried out while using the resist layer 60 as a mask, so as to pattern the magnetic layer 19. This yields a TMR film 20 having a desirable form. FIG. 3B and its subsequent drawings show only the part on the right side of a dash-single-dot line $l_1$ in FIG. 3A.

Figure 3C:
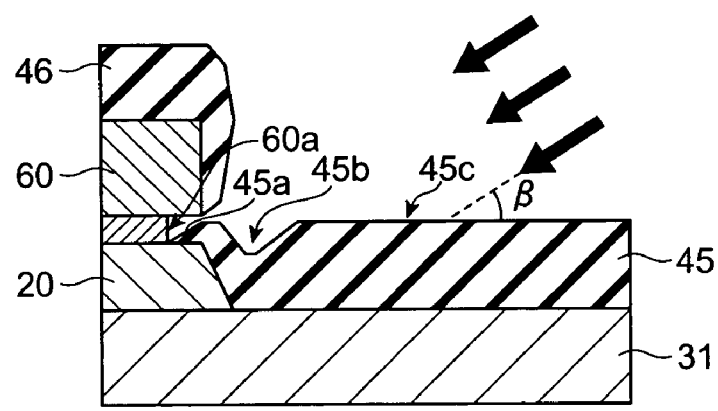

Next, as shown in FIG. 3C, an insulating layer 45 of $Al_2O_3$ or the like is formed by ion beam sputter deposition (IBSD) or the like, with which the surroundings of TMR film 20 eliminated by ion milling are filled (so-called refilling). The insulating laser 45 secures insulation between the lower shield layer 31 and an upper shield layer 39 which will later be laminated. When laminating the insulating layer 45 by sputtering, an insulating layer 46 is also deposited on the resist layer 60 in addition to the insulating layer 45 surrounding the TMR film 20.

Under the influence of the incident angle of particles at the time of ion beam sputter deposition and the like, the insulating layer 45 is formed with a protrusion 45a riding on the TMR film 20. Further, a depression 45b depressed as a shadow of the resist layer 60 (by so-called shadow effect) is formed between the protrusion 45a and a flat part 45c. As the depression 45b is shallower, the TMR film 20 and the upper shield layer 39 can be restrained from short-circuiting more effectively.

Figure 5:
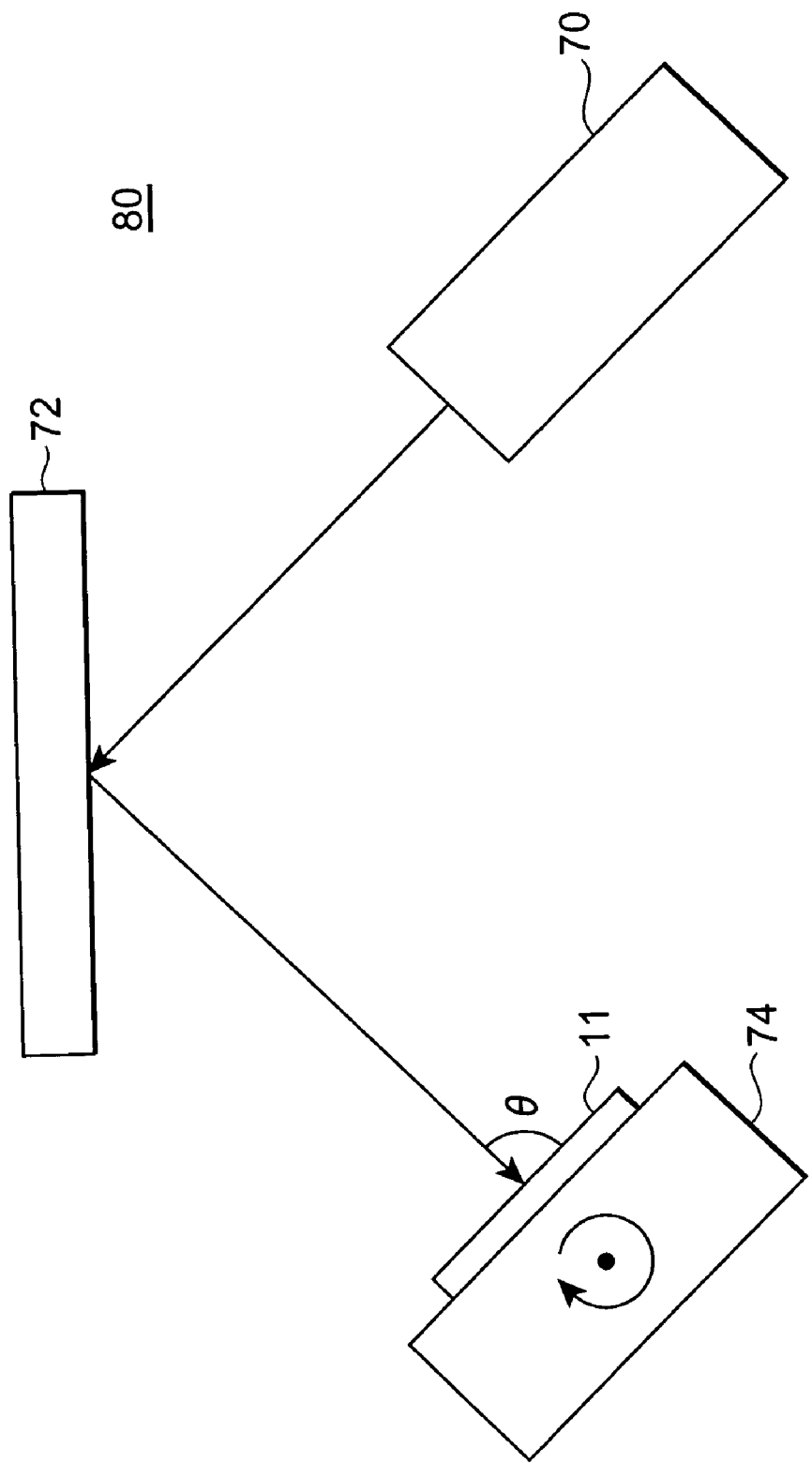
FIG. 5 is a view showing a sputtering apparatus for forming an insulating layer and a cover layer.

With reference to FIG. 5, an example of sputtering apparatus 80 for realizing ion beam sputtering deposition (IBSD) will now be explained. The sputtering apparatus 80 emits an ion beam from an ion beam source 70 toward a target 72 provided with a material for forming the insulating layer 45, thereby forming a film of the material of the target 72 onto the support 11 on a wafer stage 74. The incident angle θ of the target material with respect to the support 11 can be adjusted appropriately by rotating the wafer stage 74 about its axis.

When forming the insulating layer 45 by such an apparatus, the following technique is employed for decreasing the depression 45b. Namely, in order to prevent colliding positions of sputtering particles from being shadowed by the resist layer 60, particles are made incident on the TMR film 20 while being inclined with respect to the normal of the TMR film 20 (i.e., in a direction allowing particles to be implanted into the undercut 60a of the resist layer 60, as indicated by black arrows in FIG. 3C). This can reduce the depth of the depression 45b. However, particles are also incident on the undercut 60a, whereby the protrusion 45a formed on the TMR film 20 increases its size.

Figure 4A:
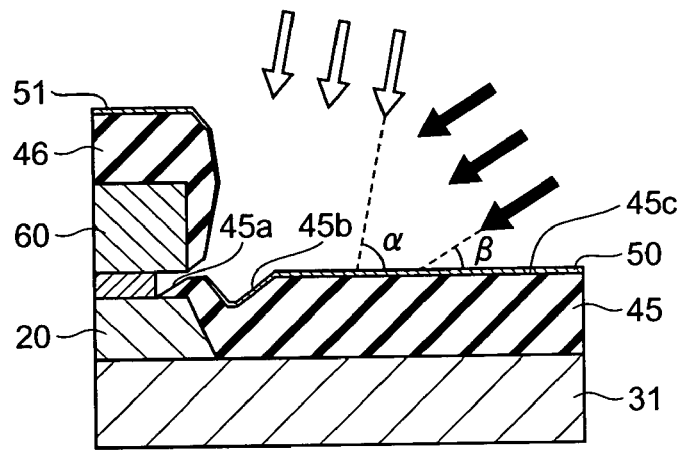
FIGS. 4A to 4D are views showing manufacturing steps subsequent to FIG. 3C.

Subsequently, as shown in FIG. 4A, a cover layer 50 made of Ta is formed on the insulating layer 45 so as to cover the depression 45b and exclude the protrusion 45a while leaving the resist layer 60. As with the insulating layer 45, the cover layer 50 can be formed by the sputtering apparatus shown in FIG. 5. Here, the angle of the wafer stage 74 with respect to the target 72 is adjusted such that the incident angle α of particles with respect to the surface direction of the TMR film 20 is greater than the incident angle β at the time of forming the insulating layer 45. Namely, the incident angle of particles at the time of forming the cover layer 50 is closer to the normal of the TMR film 20 than that at the time of forming the insulating layer 45. As a result, the cover layer 50 can be kept from covering the protrusion 45a. At the time of forming the cover layer 50, a deposited layer 51 is formed on the resist layer 60.

Figure 4B:
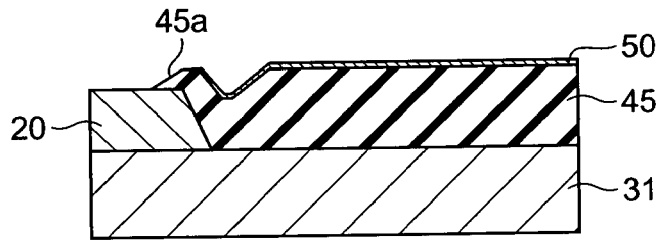

Then, as shown in FIG. 4B, liftoff is carried out, so as to remove the resist layer 60 together with the insulating layer 46 and deposited layer 51 deposited thereon. The protrusion 45a of the insulating layer 45 still remains after the liftoff. The protrusion 45a becomes a cause of blocking a path of a sense current flowing into the TMR film 20.

Figure 4C:
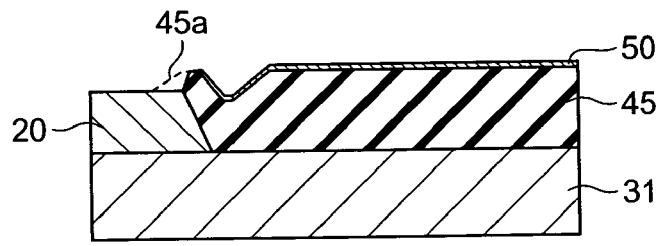

Therefore, as shown in FIG. 4C, the protrusion 45a on the TMR film 20 is eliminated by wet etching, for example. As an etchant, tetramethylammonium hydroxide (Shin-Etsu Resist SSFD-238N) may be used, for example. Here, in this embodiment, only the protrusion 45a is etched, without etching the part of insulating layer 45 clad with the cover layer 50.

Figure 4D:
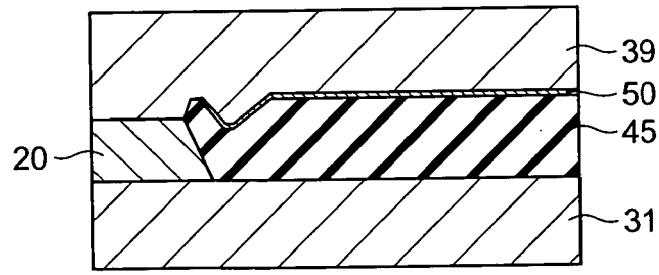

Subsequently, as shown in FIG. 4D, an upper shield layer 39 is formed by sputtering, for example, whereby a part functioning as a reproducing section of the thin-film magnetic head 10 is obtained. Thereafter, a recording section including a thin-film coil and a magnetic pole is made on the reproducing section and, by way of known processing operations of dicing the support into a plurality of bars, determining the MR height, and the like, the thin-film magnetic head 10 is completed.

In thus obtained thin-film magnetic head 10, the part of insulating layer 45 clad with the cover layer 50 is not shaven when etching the protrusion 45a as mentioned above, whereby the upper shield layer 39 and the TMR film 20 can be prevented from short-circuiting because of thinning the insulating layer 45.

The cover layer 50 may be formed not only by Ta but also by $SiO_2$, AlN, or the like. The cover layer 50 may also be formed by a metal selected from the group consisting of Ta, Cr, Ti, Fe, Co, Ru, Au, Ni, and alloys thereof. When eliminating the protrusion 45a of the insulating layer 45 by wet etching, an etchant which etches the insulating layer 45 without considerably etching the cover layer formed by the materials mentioned above is chosen. The protrusion 45a may be eliminated by dry etching instead of wet etching as well.

A head gimbal assembly and hard disk drive using the above-mentioned thin-film magnetic head 10 will now be explained while referring to their manufacturing methods.

Figure 6:
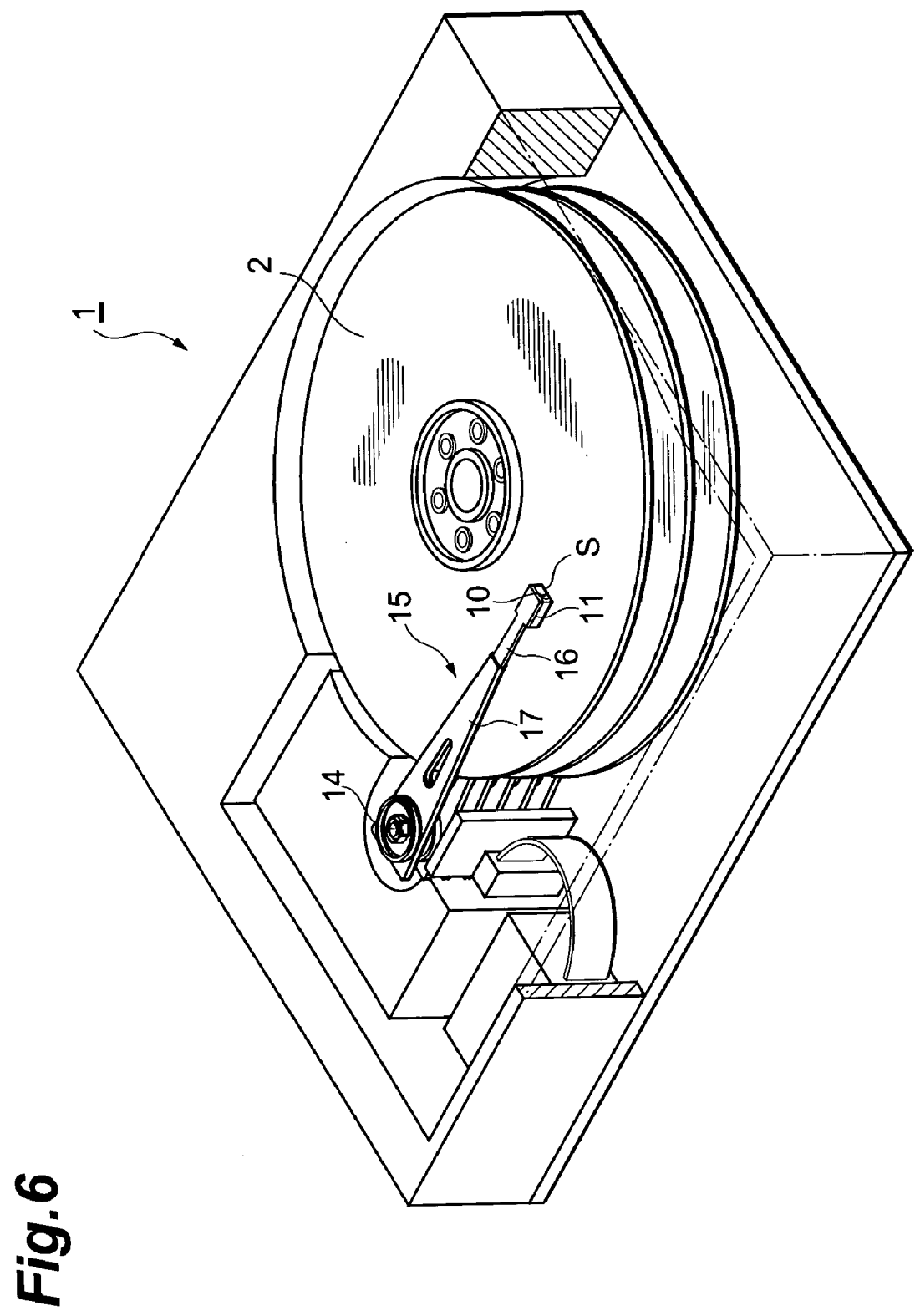
FIG. 6 is a perspective view showing an embodiment of the head gimbal assembly and hard disk drive in accordance with the present invention.

FIG. 6 is a view showing a hard disk drive 1 equipped with the thin-film magnetic head 10. The hard disk drive 1 is assembled such that a head gimbal assembly 15 is actuated so as to allow the thin-film magnetic head 10 to record and reproduce magnetic information on a recording surface (upper face in FIG. 6) of a hard disk 2 rotating at a high speed. The head gimbal assembly 15 comprises a head slider 11 (corresponding to the above-mentioned support) formed with the thin-film magnetic head 10, a gimbal 16 mounted with the head slider 11, and a suspension arm 17 connected to the gimbal 16. The head gimbal assembly 15 is rotatable about a shaft 14 by a voice coil motor, for example. When the voice coil motor is rotated, the head slider 11 moves radially of the hard disk 2, i.e., in a direction traversing track lines.

Since such head gimbal assembly 15 and hard disk apparatus 1 use the above-mentioned thin-film magnetic head 10, the protrusion 45a in the insulating layer 45 formed about the TMR film 20 can be eliminated while short-circuit can be prevented from occurring because of thinning the insulating layer 45. Therefore, the head gimbal assembly 15 and hard disk 1 attain a higher reliability.

Figure 7A:
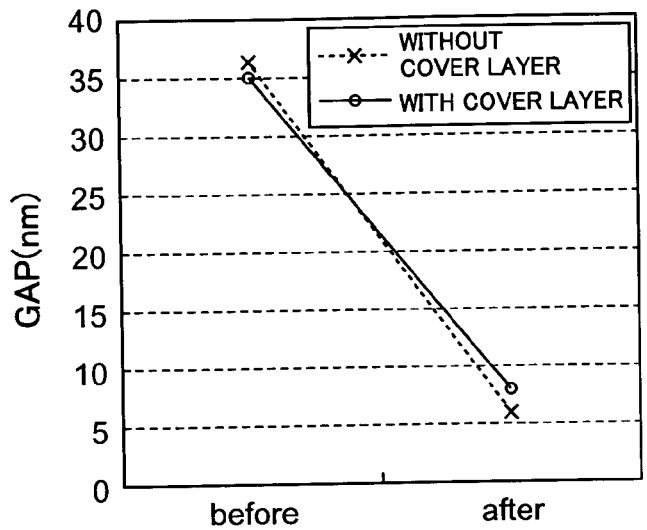
FIGS. 7A to 7C are graphs showing an example of the present invention.
Figure 7B:
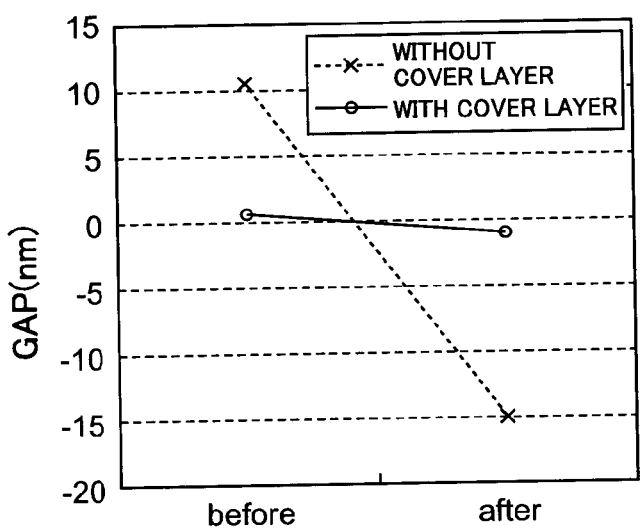
Figure 7C:
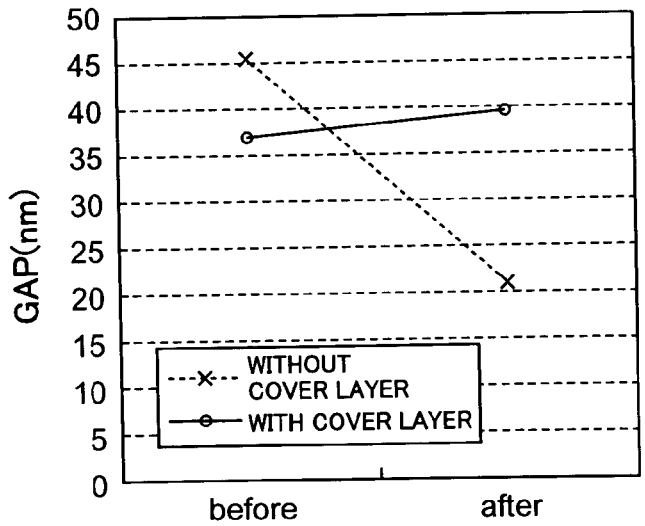
Figure 8A:
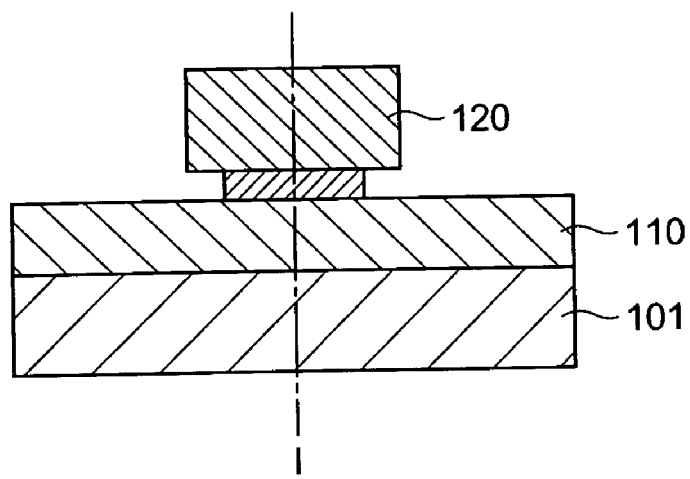
FIGS. 8A to 8C are views showing steps of making a conventional thin-film magnetic head.
Figure 8B:
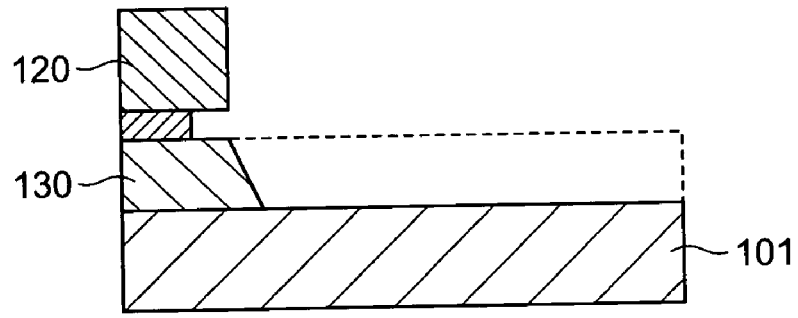
Figure 8C:
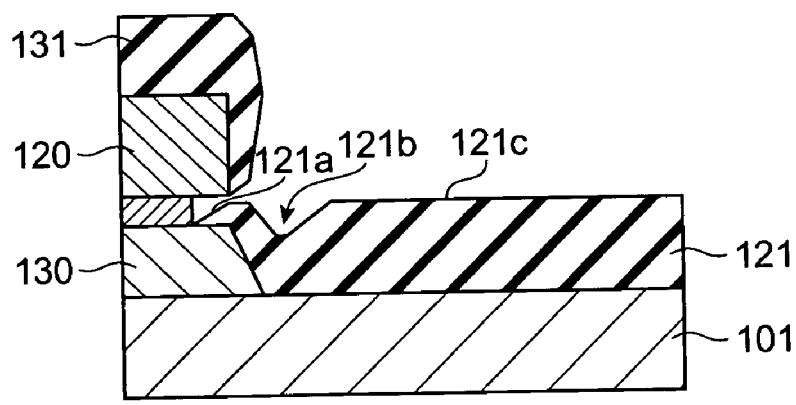
Figure 9A:
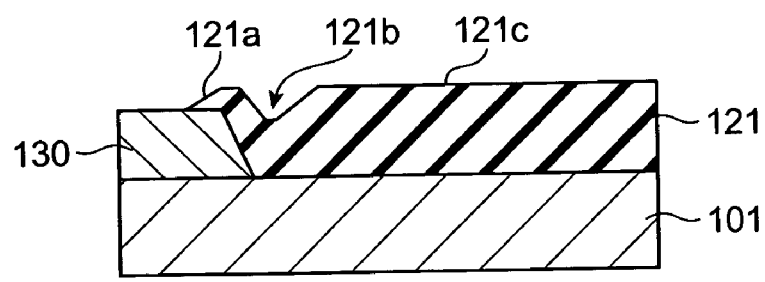
FIGS. 9A to 9C are views showing conventional manufacturing steps subsequent to FIG. 8C.
Figure 9B:
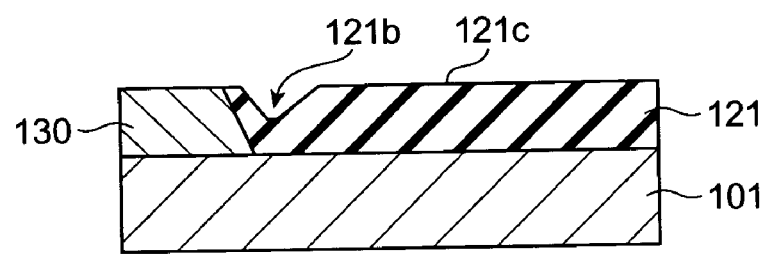
Figure 9C:
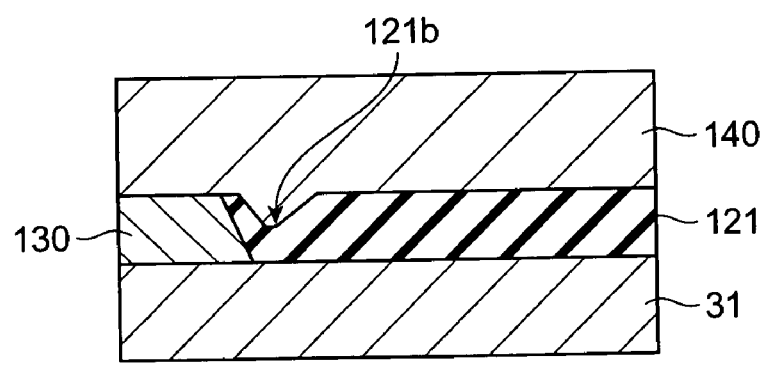

With reference to FIGS. 7A to 7C, an example of the present invention will be explained. In the example, heights of the protrusion 45a, depression 45b, and flat part 45c were measured by AFM before and after wet etching. As the etchant, tetramethylammonium hydroxide (Shin-Etsu Resist SSFD-238N) was used. The cover layer 50 was formed by Ta with a thickness of 0.5 nm. The insulating layer 45 was formed by $Al_2O_3$. As a comparative example, on the other hand, thicknesses of the parts 45a to 45c were measured in a case without the cover layer.

The ordinate in each of the graphs of FIGS. 7A to 7C indicates the vertical gap with reference to the upper face of the TMR film 20. FIGS. 7A to 7C show results of the protrusion 45a, depression 45b, and flat part 45c, respectively. Results of the example provided with the Ta cover layer are indicated by solid lines, whereas results of the comparative example without the cover layer are indicated by broken lines.

As shown in FIG. 7A, substantially all the protrusion 45a was eliminated in each of the example and comparative example. As shown in FIG. 7B, the depression was deeply shaven by etching in the comparative example, whereas the cover layer 50 deterred the depression 45b from being etched in the example. As shown in FIG. 7C, the cover layer 50 also deterred the flat part 45c from being etched. Thus, the example verified the effectiveness of providing the cover layer.

Though the invention achieved by the inventors is specifically explained with reference to the embodiment in the foregoing, the present invention is not restricted to the above-mentioned embodiment. For example, GMR (Giant MagnetoResistive) devices utilizing giant magnetoresistance effect may be used in place of the TMR device. While GMR devices include CPP-GMR causing the sense current to flow in the film thickness direction and CIP-GMR causing the sense current to flow in the surface direction, the present invention is applicable to both of them. However, the present invention is more usefully employed in the CPP-GMR, since the sense current favorably flows when the protrusion on the magnetoresistive film is eliminated.

The insulating layer and cover layer may also be formed by ion beam deposition (IBD), in which the support is irradiated with ions made from a material for forming a film, instead of ion beam sputter deposition (ISBD). Further, they may be formed by sputtering without using ion beams. For providing the cover layer so as to eliminate the protrusion, however, it is preferred that the cover layer be formed by sputtering utilizing an ion beam excellent in straightforwardness.

As explained in the foregoing, the present invention allows the protrusion riding on the magnetoresistive film to be eliminated by etching. Also, since the insulating layer surrounding the magnetoresistive film is formed with the cover layer so as to exclude the protrusion, the part of insulating layer clad with the cover layer is not etched. This can prevent short-circuit from occurring because of thinning the insulating layer.

The basic Japanese Application No. 2002-368601 filed on Dec. 19, 2002 is hereby incorporated by reference.

What is claimed is:

1. A method of making a thin-film magnetic head comprising a magnetoresistive film;
   the method comprising the steps of:
   forming a magnetic layer to become the magnetoresistive film;

forming a resist layer on an upper side of the magnetic layer;

patterning the magnetic layer while using the resist layer as a mask so as to yield the magnetoresistive film;

laminating an insulating layer about the magnetoresistive film;

forming a cover layer on the insulating layer so as to exclude a protrusion riding on the magnetoresistive film in the insulating layer; and etching the insulating layer formed with the cover layer so as to eliminate the protrusion.

2. A method of making the thin-film magnetic head according to claim 1, wherein a particle forming the cover layer has a greater incident angle with respect to a surface direction of the magnetoresistive film than an incident angle of a particle forming the insulating layer with respect to the surface direction of the magnetoresistive film.

3. A method of making the thin-film magnetic head according to claim 1, wherein the magnetoresistive film is configured such that a sense current flows in a film thickness direction.

4. A method of making the thin-film magnetic head according to claim 1, wherein the cover layer is formed by $SiO_2$ or AlN.

5. A method of making the thin-film magnetic head according to claim 1, wherein the cover layer is formed by a metal selected from the group consisting of Ta, Cr, Ti, Fe, Co, Ru, Au, Ni, and alloys thereof.

6. A method of making a head gimbal assembly comprising a thin-film magnetic head including a magnetoresistive film;

the method forming the thin-film magnetic head by carrying out at least the steps of:

forming a magnetic layer to become the magnetoresistive film;

forming a resist layer on an upper side of the magnetic layer;

patterning the magnetic layer while using the resist layer as a mask so as to yield the magnetoresistive film;

laminating an insulating layer about the magnetoresistive film;

forming a cover layer on the insulating layer so as to exclude a protrusion riding on the magnetoresistive film in the insulating layer; and etching the insulating layer formed with the cover layer so as to eliminate the protrusion;

the method further comprising the step of mounting the thin-film magnetic head to a gimbal.

7. A method of making a hard disk drive comprising a thin-film magnetic head including a magnetoresistive film;

the method forming the thin-film magnetic head by carrying out at least the steps of:

forming a magnetic layer to become the magnetoresistive film;

forming a resist layer on an upper side of the magnetic layer;

patterning the magnetic layer while using the resist layer as a mask so as to yield the magnetoresistive film;

laminating an insulating layer about the magnetoresistive film;

forming a cover layer on the insulating layer so as to exclude a protrusion riding on the magnetoresistive film in the insulating layer; and etching the insulating layer formed with the cover layer so as to eliminate the protrusion;

the method further comprising the step of assembling the hard disk drive such that the thin film magnetic head can read a magnetic signal recorded on a hard disk.

* * * * *